US008655173B2

(12) United States Patent
Bernstein et al.

(10) Patent No.: US 8,655,173 B2
(45) Date of Patent: Feb. 18, 2014

(54) EXTENDING ROUTING PROTOCOLS TO ACCOMMODATE WAVELENGTH SWITCHED OPTICAL NETWORKS

(75) Inventors: Greg Bernstein, Fremont, CA (US); Young Lee, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 1509 days.

(21) Appl. No.: 12/164,768

(22) Filed: Jun. 30, 2008

(65) Prior Publication Data

US 2009/0142056 A1 Jun. 4, 2009

Related U.S. Application Data

(60) Provisional application No. 60/974,282, filed on Sep. 21, 2007.

(51) Int. Cl.
*H04J 14/00* (2006.01)
*H04J 14/04* (2006.01)

(52) U.S. Cl.
USPC .......................................................... 398/57

(58) Field of Classification Search
USPC ............................................. 398/57; 370/254
See application file for complete search history.

(56) References Cited

U.S. PATENT DOCUMENTS

| | | | | |
|---|---|---|---|---|
| 6,757,258 | B1 * | 6/2004 | Pillay-Esnault | 370/254 |
| 2002/0018447 | A1 * | 2/2002 | Yamada et al. | 370/252 |
| 2002/0093952 | A1 * | 7/2002 | Gonda | 370/369 |
| 2003/0099014 | A1 * | 5/2003 | Egner et al. | 359/124 |
| 2003/0147645 | A1 * | 8/2003 | Imajuku et al. | 398/7 |
| 2004/0190900 | A1 | 9/2004 | Yagyu | |
| 2005/0271038 | A1 * | 12/2005 | Xin et al. | 370/351 |
| 2008/0056717 | A1 * | 3/2008 | Niven-Jenkins et al. | 398/57 |
| 2008/0170856 | A1 * | 7/2008 | Shi et al. | 398/50 |

FOREIGN PATENT DOCUMENTS

| | | | |
|---|---|---|---|
| CN | 1533060 | A | 9/2004 |
| CN | 1878047 | A * | 12/2006 |
| EP | 1881631 | A1 | 1/2008 |
| JP | 2004320390 | A | 11/2004 |
| JP | 2005269375 | A | 9/2005 |
| WO | WO 2008011770 | A1 * | 1/2008 |

OTHER PUBLICATIONS

Al-Fuqaha, et al., "Routing in all-optical DWDM Networks with Sparse Wavelength Conversion Capabilities," GLOBECOM 2003 IEEE, 2003, vol. 5, pp. 2569-2574.

(Continued)

*Primary Examiner* — Daniel Dobson
(74) *Attorney, Agent, or Firm* — Conley Rose, P.C.; Grant Rodolph; Brandt D. Howell

(57) ABSTRACT

A network component comprising a control plane controller configured to implement a method comprising transmitting routing and wavelength assignment (RWA) information to at least one adjacent control plane controller, wherein the RWA information is transmitted using an interior gateway protocol (IGP). Included is a method comprising communicating a message comprising RWA information to at least one adjacent control plane controller, wherein the message comprises an indication whether the RWA information is static or dynamic. Also included is an apparatus comprising a control plane controller configured to communicate data to at least one adjacent control plane controller, wherein the data comprises RWA information, and wherein the data comprises an indicator that indicates whether the RWA information is associated with a node, a link, or both.

20 Claims, 3 Drawing Sheets

(56) References Cited

OTHER PUBLICATIONS

Farrel, A., et al., "A Path Computation Element (PCE)-Based Architecture," Network Working Group RFC 4655, Aug. 2006, 35 pages.
Foreign Communication From a Related Counterpart Application—International Search Report and Written Opinion, PCT/CN2008/072116, Dec. 4, 2008, 10 pages.
Al-Fuqaha, Ala I., "Routing Framework for All-Optical DWDM Metro and Long-Haul Transport Networks with Sparse Wavelength Conversion Capabilities," IEEE Journal on Selected Areas in Communications, vol. 22, No. 8, Oct. 2004, pp. 1443-1459.
Bernstein, G., "Framework for GMPLS and PCE Control of Wavelength Switched Optical Networks," IETF Network Working Group, Internet Draft, draft-bernstein-ccamp-wavelength-switched-01.txt, Sep. 13, 2007, 32 pages.
Vasseur, J.P., "IGP Routing Protocol Extensions for Discovery of Traffic Engineering Node Capabilities," IETF Network Working Group, Internet Draft, draft-ietf-ccamp-te-node-cap-05.txt, Apr. 2007, 13 pages.
Bradner, S., "Key words for use in RFCs to Indicate Requirement Levels", BCP 14, RFC 2119, Mar. 1997.
Berger, L., "Generalized Multi-Protocol Label Switching (GMPLS) Signaling Functional Description", RFC 3471, Jan. 2003.
Katz, D., Kompella, K., and Yeung, D., "Traffic Engineering (TE) Extensions to OSPF Version 2", RFC 3630, Sep. 2003.
ITU-T Recommendation G.694.1, "Spectral grids for WDM applications: DWDM frequency grid", Jun. 2002.
Kompella, K., Ed., and Y. Rekhter, Ed., "Routing Extensions in Support of Generalized Multi-Protocol Label Switching (GMPLS)", RFC 4202, Oct. 2005.
Kompella, K., Ed., and Y. Rekhter, Ed., "OSPF Extensions in Support of Generalized Multi-Protocol Label Switching (GMPLS)", RFC 4203, Oct. 2005.
Papadimitriou, D., Ed., "Generalized Multi-Protocol Label Switching (GMPLS) Signaling Extensions for G.709 Optical Transport Networks Control", RFC 4328, Jan. 2006.
Kompella, K., Ed., et al., "Intermediate System to Intermediate System (IS-IS) Extensions in Support of Generalized Multi-Protocol Label Switching (GMPLS)," RFC 4205, Oct. 2005.
Kompella, K., Ed., et al., "Intermediate System to Intermediate System (IS-IS) Extensions in Support of Generalized Multi-Protocol Label Switching (GMPLS)," draft-ietf-isis-rfc4205bis-00.txt, Nov. 2006.
R. Aggarwal and K. Kompella, "Advertising a Router's Local Addresses in OSPF TE Extensions", draft-ietf-ospf-te-node-addr-03.txt, Jun. 2006.
R. Aggarwal and K. Kompella, "Advertising a Router's Local Addresses in OSPF TE Extensions", draft-ietf-ospf-te-node-addr-04.txt, Nov. 2007.
T. Otani, H. Guo, K. Miyazaki, D. Caviglia, "Generalized Labels for G.694 Lambda-Switching Capable Label Switching Routers", draft-ietf-ccamp-gmpls-g-694-lambda-labels-01.txt, May 2008.
Y. Lee, G. Bernstein, W. Imajuku, "Framework for GMPLS and PCE Control of Wavelength Switched Optical Networks", draft-ietf-ccamp-wavelength-switched-framework-00.txt, May 13, 2008.
Mannie, E., Ed., "Generalized Multi-Protocol Label Switching (GMPLS) Architecture," RFC 3945, Oct. 2004.
Moy, J., "OSPF Version 2", STD 54, RFC 2328, Apr. 1998.
Coltun, R., "The OSPF Opaque LSA Option", RFC 2370, Jul. 1998.
Berger, et al., "The OPSF Opaque LSA Option,"draft-ietf-ospf-rfc2370bis-05.txt; dated May 8, 2008, 18 pages.
Lee, Y., et al., "Routing and Wavelength Assignment Information Model for Wavelength Switched Optical Networks," Network Working Group, Internet Draft, draft-ietf-ccamp-rwa-info-02.txt, Mar. 3, 2009, 34 pages.

\* cited by examiner

EXTENDING ROUTING PROTOCOLS TO ACCOMMODATE WAVELENGTH SWITCHED OPTICAL NETWORKS

CROSS-REFERENCE TO RELATED APPLICATIONS

The present application claims priority to U.S. Provisional Patent Application Ser. No. 60/974,282 filed Sep. 21, 2007 by Bernstein et al. and entitled "Method for Extending Routing Protocols to Accommodate Wavelength Switched Optical Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wavelength division multiplexing (WDM) is one technology that is envisioned to increase bandwidth capability and enable bidirectional communications in optical networks. In WDM networks, multiple data signals can be transmitted simultaneously between network elements (NEs) using a single fiber. Specifically, the individual signals may be assigned different transmission wavelengths so that they do not interfere or collide with each other. The path that the signal takes through the network is referred to as the lightpath. One type of WDM network, a wavelength switched optical network (WSON), seeks to switch the optical signals with fewer optical-electrical-optical (OEO) conversions along the lightpath, e.g. at the individual NEs, than existing optical networks.

One of the challenges in implementing WDM networks is the determination of the routing and wavelength assignment (RWA) for the various signals that are being transported through the network at any given time. To complete the RWA process, sufficient information must be provided to this process to insure its successful completion. As such, the RWA continues to be one of the challenges in implementing WDM technology in optical networks.

SUMMARY

In one embodiment, the disclosure includes a network component comprising a control plane controller configured to implement a method comprising transmitting RWA information to at least one adjacent control plane controller, wherein the RWA information is transmitted using an interior gateway protocol (IGP).

In another embodiment, the disclosure includes a method comprising communicating a message comprising RWA information to at least one adjacent control plane controller, wherein the message comprises an indication whether the RWA information is static or dynamic.

In yet another embodiment, the disclosure includes an apparatus comprising a control plane controller configured to communicate data to at least one adjacent control plane controller, wherein the data comprises RWA information, and wherein the data comprises an indicator that indicates whether the RWA information is associated with a node, a link, or both.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for extending an IGP to communicate RWA information to control plane controllers in a WDM network, such as the WSON. Specially, a control plane controller may gather RWA information from a NE and send a message comprising the RWA information to a plurality of adjacent control plane controllers using an IGP. Examples of RWA information included in the message are a connectivity matrix, a wavelength restriction, a wavelength range, a channel spacing, a transmitter range, a wavelength conversion capability, a wavelength bandwidth, a wavelength availability, and combinations thereof. The message may further comprise a status indicator that indicates whether each RWA information is static or dynamic, as well as a type indicator that indicates whether each RWA information is associated with a node or a link. By flooding the RWA information to the adjacent control plane controllers, the control plane controllers become aware of the RWA information for a plurality of adjacent NEs, which may allow the control plane controllers to perform distributed routing assignment (RA), wavelength assignment (WA), or both.

Figure 1:
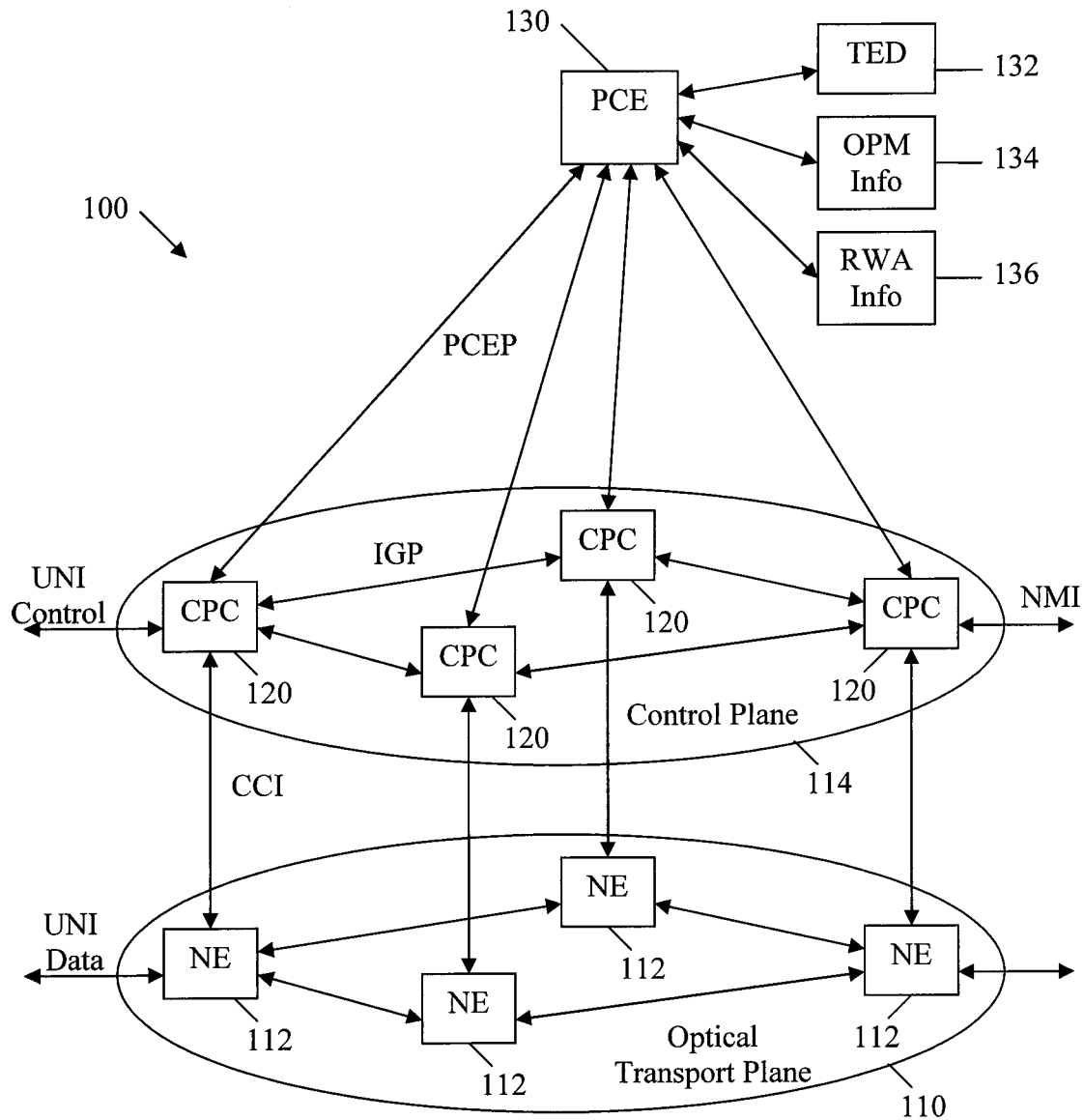
FIG. 1 is a schematic diagram of an embodiment of a WSON system.

FIG. 1 illustrates one embodiment of a WSON system 100. The system 100 may comprise an optical transport plane 110, a control plane 114, and a PCE 130. The optical transport plane 110 may comprise a plurality of NEs 112 coupled to one another using optical fibers. Similarly, the control plane 114 may comprise a plurality of control plane controllers 120 coupled to one another using optical fibers, perhaps the same optical fibers used to connect the NEs 112. In an embodiment, the optical fibers may also be considered NEs 112. The NEs 112, control plane controllers 120, and PCE 130 may communicate with each other via optical, electrical, or wireless means. A plurality of optical signals may be transported through the optical transport plane 110 over lightpaths that may pass through some of the NEs 112. In addition, at least some of the NEs 112, for example those at the ends of the optical transport plane 110, may be configured to convert between electrical signals from external sources, e.g. user network interface (UNI) data, and the optical signals used in the optical transport plane 110. Similarly, at least some of the control plane controllers 120, for example those at the ends of the control plane 114, may be configured to convert between electrical signals from external sources, e.g. UNI control and/or network management interface (NMI) signals, and the optical signals used in the control plane 114. Although four NEs 112, four control plane controllers 120, and one PCE 130 are shown in the system 100, the system 100 may comprise any number of NEs 112, control plane controllers 120, or PCEs 130. Moreover, while a one-to-one relationship between the control plane controllers 120 and the NEs 110 is illustrated in FIG. 1, there may be many NEs 112 associated with a single control plane controller 120, or vice-versa. Similarly, while the control plane controllers 120 are associated with a single PCE 130 in FIG. 1, there may be many PCEs 130 in the system 100, and the control plane controllers 120 may be associated with one or more of the PCEs 130.

The optical transport plane 110 may be part of the system 100 that uses active or passive components to transport optical signals. The optical transport plane 110 may implement WDM to transport the optical signals through the optical transport plane 110, and may comprise various optical components as described in detail below. The optical transport plane 110 may be part of a long haul network, a metropolitan network, or a residential access network.

The NEs 112, also referred to as nodes, may be any devices or components that transport signals through the optical transport plane 110. In an embodiment, the NEs 112 consist essentially of optical processing components, such as line ports, add ports, drop ports, transmitters, receivers, amplifiers, optical taps, and so forth, and do not contain any electrical processing components. Alternatively, the NEs 112 may comprise a combination of optical processing components and electrical processing components. At least some of the NEs 112 may be configured with wavelength converters, optical-electrical (OE) converters, electrical-optical (EO) converters, OEO converters, or combination thereof. However, it may be advantageous for at least some of the NEs 112 to lack such converters as such may reduce the cost and complexity of the system 100. In specific embodiments, the NEs 112 may comprise optical cross connects (OXCs), photonic cross connects (PXCs), type I or type II reconfigurable optical add/drop multiplexers (ROADMs), wavelength selective switches (WSSs), fixed optical add/drop multiplexers (FOADMs), or combination thereof.

The NEs 112 may be coupled to each other via optical fibers, also referred to as links. The optical fibers may be used to establish optical links and transport the optical signals between the NEs 112. The optical fibers may comprise standard single mode fibers (SMFs) as defined in International Telecommunications Union-Telecommuications Standardization Sector (ITU-T) standard G.652, dispersion shifted SMFs as defined in ITU-T standard G.653, cut-off shifted SMFs as defined in ITU-T standard G.654, non-zero dispersion shifted SMFs as defined in ITU-T standard G.655, wideband non-zero dispersion shifted SMFs as defined in ITU-T standard G.656, or combinations thereof. These fiber types may be differentiated by their optical impairment characteristics, such as attenuation, chromatic dispersion, polarization mode dispersion, four wave mixing, or combinations thereof. These effects may be dependent upon wavelength, channel spacing, input power level, or combinations thereof. The optical fibers may be used to transport WDM signals, such as course WDM (CWDM) signals as defined in ITU-T G.694.2 or dense WDM (DWDM) signals as defined in ITU-T G.694.1. All of the standards described herein are incorporated herein by reference.

The control plane 114 may be any part of the system 100 that handles operation, administration, and maintenance (OAM), control messages, and/or general administration of the system 100. The control plane 114 may use the optical transport plane 110 to exchange messages, or may have its own message distribution network. The control plane 114 may comprise various control plane controllers 120 as described in detail below.

The control plane controllers 120, also called optical connection controllers, may coordinate activities between the NEs 112. Specifically, the control plane controllers 120 may receive optical connection requests and provide lightpath signaling to the NEs 112 via an connection control interface (CCI), thereby coordinating the NEs 112 such that data signals are routed through the optical transport plane 110 with little or no contention. The control plane controllers may communicate with each other using any suitable protocol, such as Generalized Multi-Protocol Label Switching (GMPLS) or an IGP. In addition, the control plane controllers 120 may communicate with the PCE 130 using PCE protocol (PCEP) to provide the PCE 130 with information that may be used for the RWA, receive the RWA from the PCE 130, and/or forward the RWA to the NEs 112. The control plane controllers 120 may be located in a component outside of the NEs 112, such as an external server, or may be part of the NEs 112. In an embodiment, the control plane controllers 120 can compute the RA, the WA, or both.

The PCE 130 may perform all or part of the RWA for the WSON system 100. Specifically, the PCE 130 may receive the wavelength or other information that may be used for the RWA from the control plane controllers 120, from the NEs 112, or both. The PCE 130 may process the information to obtain the RWA, for example, by computing the routes, e.g. lightpaths, for the optical signals, specifying the optical wavelengths that are used for each lightpath, and determining the NEs 112 along the lightpath at which the optical signal should be converted to an electrical signal or a different wavelength. The RWA may include at least one route for each incoming signal and at least one wavelength associated with each route. The PCE 130 may then send all or part of the RWA information to the control plane controller 120 or directly to the NEs 112. To assist the PCE 130 in this process, the PCE 130 may comprise or interface with a global traffic-engineering database (TED) 132, a RWA information database 136, an optical performance monitor (OPM) 134, a physical layer constraint (PLC) information database (not shown), or combinations thereof. The PCE 130 may be located in a component outside of the system 100, such as an external server, or may be located in a component within the system 100, such as a control plane controller 120 or a NE 112.

In some embodiments, the RWA information may be sent to the PCE 130 by a path compuation client (PCC). The PCC may be any client application requesting a path computation to be performed by the PCE 130. The PCC may also be any network component that makes such a request, such as the control plane controller 120, or any NE 112, such as a ROADM or a FOADM.

Figure 2:
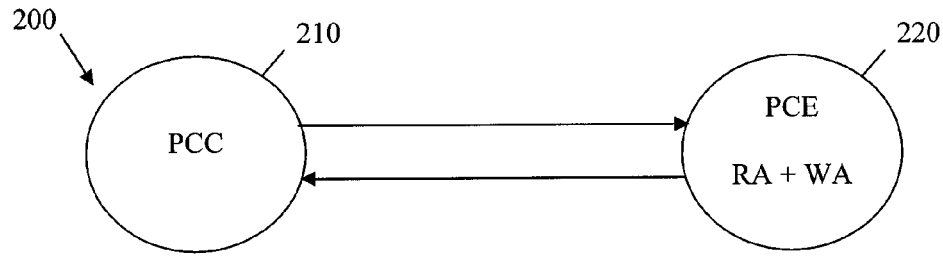
FIG. 2 is a schematic diagram of an embodiment of a path computation element (PCE) architecture.

The PCE 130 may be embodied in one of several architectures. FIG. 2 illustrates an embodiment of a combined RWA architecture 200. In the combined RWA architecture 200, the PCC 210 communicates the RWA request and the required information to the PCE 220, which implements both the routing assignment and the wavelength assignment functions using a single computation entity, such as a processor. For example, the processor may process the RWA information using a single or multiple algorithms to compute the lightpaths as well as to assign the optical wavelengths for each lightpath. The amount of RWA information needed by the PCE 220 to compute the RWA may vary depending on the algorithm used. If desired, the PCE 220 may not compute the RWA until sufficient network links are established between the NEs or when sufficient RWA information about the NEs and the network topology is provided. The combined RWA architecture 200 may be preferable for network optimization, smaller WSONs, or both.

Figure 3:
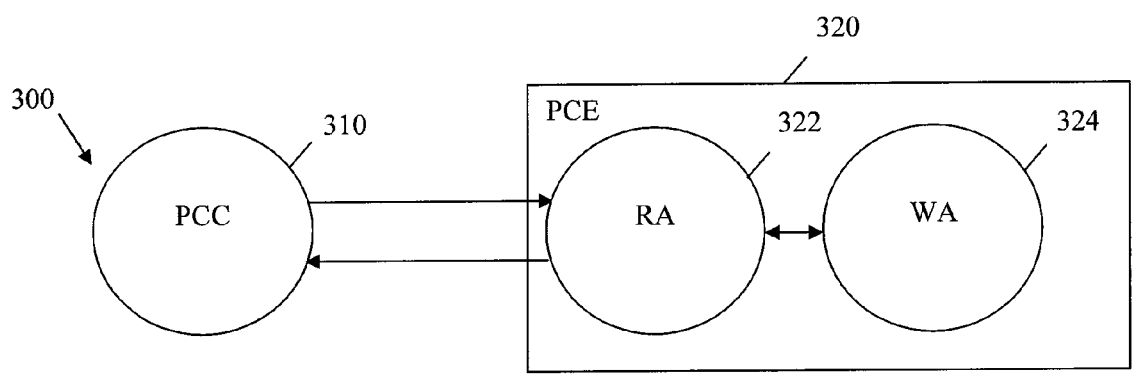
FIG. 3 is a schematic diagram of another embodiment of the PCE architecture.

FIG. 3 illustrates an embodiment of a separated RWA architecture 300. In the separated RWA architecture 300, the PCC 310 communicates the RWA request and the required information to the PCE 320, which implements both the routing function and the wavelength assignment function using separate computation entities, such as processors 322 and 324. Alternatively, the separated RWA architecture 300 may comprise two separate PCEs 320 each comprising one of the processors 322 and 324. Implementing routing assignment and wavelength assignment separately may offload some of the computational burden on the processors 322 and 324 and reduce the processing time. In an embodiment, the PCC 310 may be aware of the presence of only one of two processors 322, 324 (or two PCEs) and may only communicate with that processor 322, 324 (or PCE). For example, the PCC 310 may send the RWA information to the processor 322, which may compute the lightpath routes and forward the routing assignment to the processor 324 where the wavelength assignments are performed. The RWA may then be passed back to the processor 322 and then to the PCC 310. Such an embodiment may also be reversed such that the PCC 310 communicates with the processor 324 instead of the processor 322.

In either architecture 200 or 300, the PCC 210 or 310 may receive a route from the source to destination along with the wavelengths, e.g. GMPLS generalized labels, to be used along portions of the path. The GMPLS signaling supports an explicit route object (ERO). Within an ERO, an ERO label sub-object can be used to indicate the wavelength to be used at a particular NE. In cases where the local label map approach is used, the label sub-object entry in the ERO may have to be translated.

Figure 4:
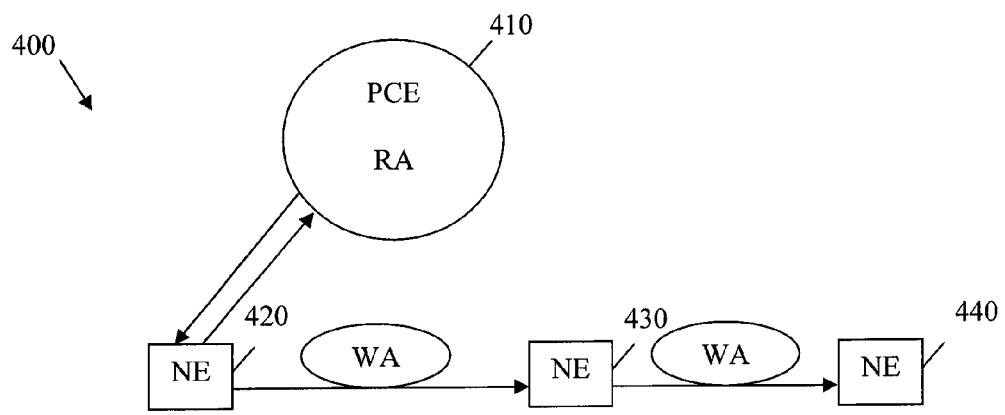
FIG. 4 is a schematic diagram of another embodiment of the PCE architecture.

FIG. 4 illustrates a distributed wavelength assignment architecture 400. In the distributed wavelength assignment architecture 400, the PCE 410 may receive some or all of the RWA information from the NEs 420, 430, and 440, perhaps via direct link, and implements the routing assignment. The PCE 410 then directly or indirectly passes the routing assignment to the individual NEs 420, 430, and 440, which assign the wavelengths at the local links between the NEs 420, 430, and 440 based on local information. Specifically, the NE 420 may receive local RWA information from the NEs 430 and 440 and send some or all of the RWA information to the PCE 410. The PCE 410 may compute the lightpaths using the received RWA information and send the list of lightpaths to the NE 420. The NE 420 may use the list of lightpaths to identify the NE 430 as the next NE in the lightpath. The NE 420 may establish a link to the NE 430 and use the received local RWA information that may comprise additional constraints to assign a wavelength for transmission over the link. The NE 430 may receive the list of lightpaths from the NE 420, use the list of lightpaths to identify the NE 440 as the next NE in the lightpath, establish a link to the NE 440, and assign the same or a different wavelength for transmission over the link. Thus, the signals may be routed and the wavelengths may be assigned in a distributed manner between the remaining NEs in the network. Assigning the wavelengths at the individual NEs may reduce the amount of RWA information that has to be sent to the PCE 410.

Figure 5:
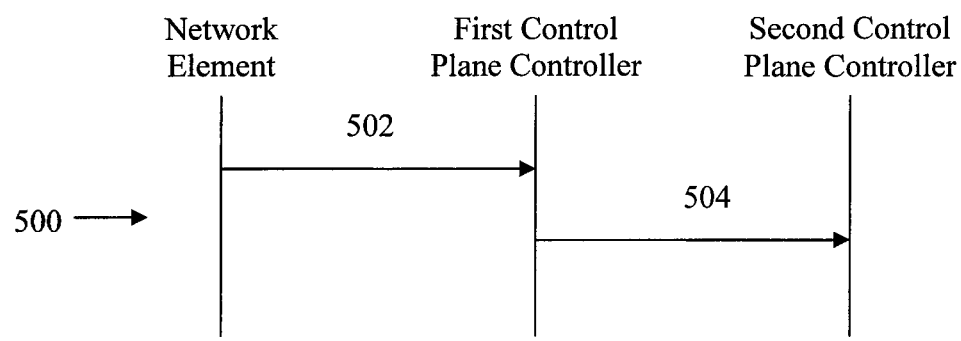
FIG. 5 is a protocol diagram of an embodiment of the communications between a NE, a first control plane controller, and a second control plane controller.

FIG. 5 illustrates an embodiment of a communication method 500 between a NE, a first control plane controller, and a second control plane controller, which may be an adjacent control plane controller. In some embodiments, the method 500 may occur between a NE, a first control plane controller, and the PCE, for example, when the first control plane controller sends the RWA information to the TED in the PCE. In the method 500, the first control plane controller obtains the RWA information 502 from at least one NE. The NE may send the RWA information 502 to the first control plane controller without prompting by the first control plane controller, or the NE may send the RWA information 502 to the first control plane controller in response to a request by the first control plane controller. The first control plane controller then sends a message 504 to the second control plane controller, where the message 504 comprises at least one of the RWA information described below. The message 504 may also contain a status indicator that indicates whether the RWA information is static or dynamic. In an embodiment, the status indicator may indicate how long the static or dynamic status lasts, so that the second control plane controller can know how long the RWA information is valid and/or when to expect an update. Additionally or alternatively, the message 504 may contain a type indicator that indicates whether the RWA information is associated with a node, a link, or both.

The message 504 may be transmitted or communicated using any suitable protocol, such as the IGP. The IGP may be a routing protocol used for exchanging route information among gateways, such as host computer or routers, in an autonomous network. Internet networks can be divided into multiple domains or multiple autonomous systems, where one domain congregates a batch of host computers and routers that employ the same routing protocol. In such a case, the IGP may be provided for selecting a route in a domain. The IGP may be link-state routing protocol in that each node possesses information about the complete network topology. In such a case, each node can independently calculate the best next hop from it for every possible destination in the network using local information of the topology. The collection of best next hops may form the routing table for the node. In a link-state protocol, the only information that may be passed between the nodes is information used to construct the connectivity maps. Examples of suitable IGPs include open shortest path first (OSPF) and intermediate system to intermediate system (IS-IS).

As mentioned above, the message 504 may comprise RWA information. RWA information may be any information or data that may be used to calculate the RWA solution. In an embodiment, the RWA information may include a connectivity matrix. The connectivity matrix may be the internal port-to-port connectivity of a node, such as the ROADM or OXC described above. The connectivity matrix can be represented by a matrix where the rows of the matrix represent the node's ingress ports, the columns of the matrix represent the node's egress ports (or vice-versa), and the individual elements within the matrix indicate the connectivity between the respective ingress port and egress port. For example, a one may be used to indicate connectivity between the ingress port and the egress port, and a zero may be used to indicate a lack of connectivity between the ingress port and the egress port (or vice-versa). The connectivity matrix may be static in that port-to-port connectivity of the node does not typically change once the node is installed in the network. Finally, the message 504 may contain the connectivity matrix for each node within the network.

In an embodiment, the RWA information may include a wavelength restriction. The wavelength restriction, also referred to as the per port wavelength restriction, may indicate the modulation formats that the node or link can accept. For example, the node or link may be able to accept return-to-zero (RZ), non-return-to-zero (NRZ), non-return-to-zero, inverted (NRZI), or other modulation formats. The wavelength restriction may be static in that wavelength restriction that a node or link can accept does not typically change once the node or link is installed in the network. It will be appreciated that the wavelength restrictions for a node may be the same for the entire node or may vary from port to port. In addition, the wavelength restrictions for the node or for a node's port may be independent of and perhaps different from the wavelength restrictions for the link that is coupled to an individual port on the node. Finally, the message 504 may contain the wavelength restriction for each node, each node's ports, each fiber, or combinations thereof within the network.

In an embodiment, the RWA information may include a wavelength range. The wavelength range, which may also be referred to as the WDM link or fiber wavelength range, may indicate how many different wavelengths a link or port can simultaneously accept, the range of wavelengths that the link or port can accept, or both. For example, the wavelength range may be multiple wavelengths selected from a full range of wavelengths, which may indicate that the node or link can accept a plurality of wavelengths simultaneously and is colorless in that it has no limitations on which wavelengths it can accept. Alternatively, the wavelength range may be a single wavelength selected from a full range of wavelengths, which may indicate that the node or link can accept only one wavelength at a time, but is colorless in that it has no limitations on which wavelength it can accept. Further in the alternative, the wavelength range may be a single, fixed wavelength, which may indicate that the node or link can accept only one wavelength at a time and is colorful in that it is limited to a single wavelength. Moreover, the wavelength range may be multiple wavelengths selected from a reduced range of wavelengths, which may indicate that the node or link can accept a plurality of wavelengths simultaneously and is limited in the wavelengths it can accept, similar to wave band switching. Specifically, the node or link may be limited to a plurality of individual, discrete wavelengths or may be limited to a reduced range of wavelengths. The wavelength range may be static in that wavelength range that a node or link can accept does not typically change once the node or link is installed in the network. It will be appreciated that the wavelength range for a node may be the same for the entire node or may vary from port to port. In addition, the wavelength ranges for the node or for a node's port may be independent of and perhaps different from the wavelength ranges for the link that is coupled to an individual port on the node. Finally, the message 504 may contain the wavelength range for each node, each node's ports, each fiber, or combinations thereof within the network.

In an embodiment, the RWA information may include a channel spacing. The channel spacing, which may also be referred to as the WDM link channel spacing, may indicate the distance between wavelength channels in nanometers (or frequency spacing in inverse seconds). Alternatively, the channel spacing may identify a specific standard or other publication that defines the channel spacing. For example, the channel spacing could indicate that the node or links can accept CWDM channel spacing, DWDM channel spacing, or combinations thereof. It will be appreciated that the channel spacing for a node may be the same for the entire node or may vary from port to port. In addition, the channel spacing for the node or for a node's port may be independent of and perhaps different from the channel spacing for the link that is coupled to an individual port on the node. Finally, the message 504 may contain the channel spacing for each node, each node's ports, each fiber, or combinations thereof within the network.

In an embodiment, the RWA information may include a transmitter range. The transmitter range, which may be referred to as the laser transmitter range, may indicate the tunable range of wavelengths that a transmitter can transmit or that a node or link can accept. For example, the laser, node, or link may be colorless in that it has no limitations on which wavelengths it can transmit or accept. Alternatively, the laser, node, or link may be colorful in that it is limited to a single wavelength. Further in the alternative, the laser, node, or link may have a reduced range of wavelengths in that it is limited in the wavelengths it can transmit or accept. Specifically, the laser, node, or link may be limited to a plurality of individual, discrete wavelengths or may be limited to a reduced range of wavelengths. It will be appreciated that the transmitter range for a node may be the same for the entire node or may vary from port to port. In addition, the transmitter range for the node or for a node's port may be independent of and perhaps different from the transmitter range for the link that is coupled to an individual port on the node. Finally, the message 504 may contain the transmitter range for each node, each node's ports, each fiber, or combinations thereof within the network.

In an embodiment, the RWA information may include a wavelength conversion capability. The wavelength conversion capability may indicate whether a node has the ability to convert the wavelength to a different wavelength, e.g. via an OEO conversion. Additionally or alternatively, the wavelength conversion capability may indicate regeneration capability if the converters are also regenerators. The wavelength conversion capability may be static in that wavelength conversion capability of the node does not typically change once the node is installed in the network. However, the wavelength conversion capability may be dynamic in the case where there are a limited number of converters and the number of available converters can change with changing connection establishment within the network. Finally, the message 504 may contain the wavelength conversion capability for each node within the network.

In an embodiment, the RWA information may include a wavelength bandwidth. The wavelength bandwidth, which may also be referred to as the maximum bandwidth per wavelength, may indicate the bandwidth capacity or transmission rate associated with a wavelength in a node or link. For example, a wavelength could accept any transmission rate up to the specified rate, e.g. 10 gigabits per second (Gbps). Alternatively, the wavelength could be limited in operation to the specified rate, e.g. 40 Gbps. The wavelength bandwidth may be static in that wavelength bandwidth of a node or link does not typically change once the node or link is installed in the network. It will be appreciated that the laser wavelength bandwidth for a node may be the same for the entire node or may vary from port to port. In addition, the wavelength bandwidth for the node or for a node's port may be independent of and perhaps different from the wavelength bandwidth for the link that is coupled to an individual port on the node. Finally, the message 504 may contain the wavelength bandwidth for each node, each node's ports, each fiber, or combinations thereof within the network.

In an embodiment, the RWA information may include a wavelength availability. The wavelength availability may indicate the availability of a wavelength at a node or link. For example, the wavelength availability may indicate the availability of a single wavelength on a specific link within the network. The wavelength availability may be dynamic in that wavelength availability of a node or link may vary any time there is a change in routing or wavelength assignment or use within the network. It will be appreciated that the laser wavelength availability for a node may be the same for the entire node or may vary from port to port. In addition, the wavelength availability for the node or for a node's port may be independent of and perhaps different from the wavelength availability for the link that is coupled to an individual port on the node. Finally, the message 504 may contain the wavelength availability for each node, each node's ports, each fiber, or combinations thereof within the network.

In some embodiments, all of the RWA information described herein may be needed to compute the RWA solution. For example, the connectivity matrix, the wavelength restriction, the wavelength range, the channel spacing, the transmitter range, the wavelength conversion capability, the wavelength bandwidth, and the wavelength availability may be required for the control plane controllers, the PCE, or both to calculate the RWA in the combined RWA architecture described above. However, only some of the RWA information described herein may be required to calculate the RWA in other embodiments. For example, the wavelength availability may not be needed by the control plane controllers, the PCE, or both in the case of the distributed WA architecture described above. Specifically, the RWA information may be sent to the control plane controllers so that they can compute the RA, the WA, or both. Thus, the RWA information that the control plane controllers and/or the PCE may need may vary from case to case.

Figure 6:
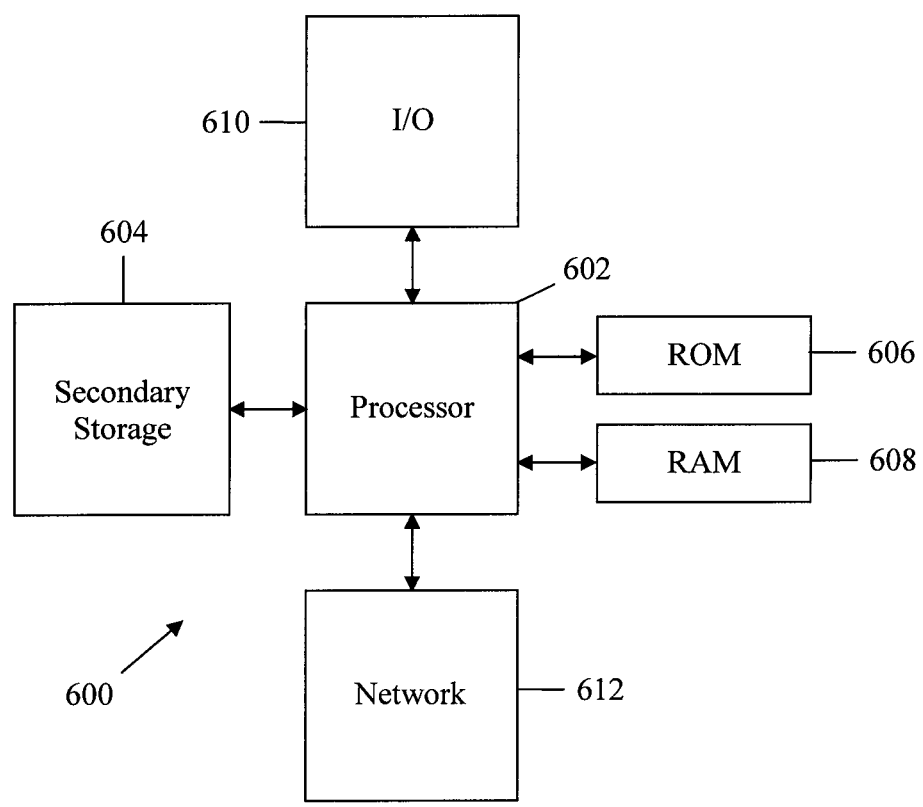
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
a control plane controller associated with an optical network for forwarding optical signals and configured to:
transmit a message with routing and wavelength assignment (RWA) information to at least one adjacent control plane controller,
wherein the message is transmitted using an interior gateway protocol (IGP) and comprises a type indicator separate from the RWA information,
wherein the type indicator indicates whether the RWA information is associated with a node, a link, or both,
wherein not all of the optical signals in the network are compatible with all network elements in the network,
wherein the RWA information comprises a connectivity matrix and a wavelength range that indicates the range of wavelengths a node's receiver can receive, and
wherein the type indicator indicates that the connectivity matrix is associated with a node.

2. The network component of claim 1, wherein the IGP is open shortest path first (OSPF).

3. The network component of claim 1, wherein the IGP is intermediate system to intermediate system (IS-IS).

4. The network component of claim 1, wherein the RWA information comprises a wavelength restriction.

5. The network component of claim 1, wherein the RWA information comprises a channel spacing.

6. The network component of claim 1, wherein the RWA information comprises a transmitter range that indicates the tunable range of wavelengths that a transmitter can transmit.

7. The network component of claim 1, wherein the RWA information comprises a wavelength conversion capability.

8. The network component of claim 1, wherein the RWA information comprises a wavelength bandwidth that indicates the transmission rate of a wavelength in a node, a link, or both.

9. The network component of claim 1, wherein the RWA information comprises a wavelength availability.

10. The network component of claim 1, wherein the control plane controller is further configured to collect the RWA information from the network elements.

11. A method comprising:
communicating, by a processor, a message comprising routing and wavelength assignment (RWA) information to at least one adjacent control plane controller,
wherein the message comprises a status indicator separate from the RWA information to indicate whether the RWA information is static or dynamic,
wherein the RWA information comprises a transmitter range that indicates the tunable range of wavelengths that a transmitter can transmit,
wherein the RWA information comprises a channel spacing, and
wherein the status indicator indicates the channel spacing is static.

12. The method of claim 11, wherein the RWA information comprises a wavelength conversion capability and a wavelength availability, and wherein the wavelength conversion capability is static and the wavelength availability is dynamic.

13. A method comprising:
communicating, by a processor, a message comprising routing and wavelength assignment (RWA) information to at least one adjacent control plane controller,
wherein the message comprises a status indicator separate from the RWA information to indicate whether the RWA information is static or dynamic,
wherein the RWA information comprises a transmitter range that indicates the tunable range of wavelengths that a transmitter can transmit,
wherein the RWA information comprises a wavelength conversion capability and a wavelength availability, and wherein the wavelength conversion capability is static and the wavelength availability is dynamic,
wherein the RWA information comprises a connectivity matrix, a wavelength restriction, a wavelength range that indicates the range of wavelengths a node's receiver can receive, a channel spacing, and a wavelength bandwidth that indicates the transmission rate of a wavelength in a node, a link, or both, and
wherein the connectivity matrix is static, the wavelength restriction is static, the wavelength range is static, the channel spacing is static, and the wavelength bandwidth is static.

14. The method of claim 11, wherein the message is communicated using an interior gateway protocol (IGP), and wherein the message comprises a type indicator separate from the RWA information, wherein the type indicator indicates whether the RWA information is associated with a node, a link, or both.

15. An apparatus comprising:
a control plane controller configured to gather routing and wavelength assignment (RWA) information from a network element and to transmit a message comprising the RWA information to at least one adjacent control plane controller,
wherein the message comprises a type indicator separate from the RWA information,
wherein the type indicator indicates whether the RWA information is associated with a link, a node, or both,
wherein the message comprises a status indicator separate from the RWA information that indicates whether the RWA information is static or dynamic,
wherein the RWA information comprises a wavelength bandwidth that indicates the transmission rate of a wavelength in a node, a link, or both,
wherein the RWA information comprises a connectivity matrix, a wavelength restriction, a wavelength range that indicates the range of wavelengths a node's receiver can receive, a channel spacing, and a transmitter range that indicates the tunable range of wavelengths that a transmitter can transmit, and
wherein the type indicator indicates that the connectivity matrix is associated with a node, the wavelength restriction is associated with a link or node, the wavelength range is associated with a link, the channel spacing is associated with a link, and the transmitter range is associated with a link.

16. The apparatus of claim 15, wherein the RWA information comprises a wavelength conversion capability and a wavelength availability, and wherein the indicator indicates that the wavelength conversion capability is associated with a node and the wavelength availability is associated with a link.

17. The apparatus of claim 15, wherein the status indicator indicates that the connectivity matrix is static, the wavelength restriction is static, the wavelength range is static, the channel spacing is static, the transmitter range is static, the wavelength conversion capability is static, the wavelength bandwidth is static, and the wavelength availability is dynamic.

18. The apparatus of claim 15, wherein the message is communicated using an interior gateway protocol (IGP).

19. A method comprising:
transmitting, by a processor, a message with routing and wavelength assignment (RWA) information about a network element in an optical network,
wherein the message comprises dynamic RWA information and static RWA information,
wherein the dynamic RWA information is separated from the static RWA information,
wherein the message comprises a status indicator separate from the RWA information to indicate whether the RWA information is static or dynamic,
wherein not all of the optical signals in the network are compatible with all network elements in the network,
wherein the RWA information comprises a connectivity matrix, a wavelength restriction, a wavelength range that indicates a range of wavelengths a node's receiver can receive, a channel spacing, and a wavelength bandwidth that indicates a transmission rate of a wavelength in a node, a link, or both, and
wherein the connectivity matrix is static, the wavelength restriction is static, the wavelength range is static, the channel spacing is static, and the wavelength bandwidth is static.

20. A method comprising:
transmitting, by a processor, a message comprising routing and wavelength assignment (RWA) information associated with an optical network and a type indicator separate from the RWA information,
wherein the type indicator indicates whether the RWA information is associated with a link or a node,
wherein the RWA information comprises a connectivity matrix that indicates restrictions regarding switching ingress ports to specific connections on a specific egress port if the type indicator indicates that the RWA information is associated with a node,
wherein the RWA information further comprises static port restrictions that a network element and node impose on a port and connections available for use on a link if the type indicator indicates that the RWA information is associated with a link,
wherein the RWA information further comprises a transmitter range that indicates the tunable range of wavelengths that a transmitter can transmit,
wherein not all of the optical signals in the network are compatible with all network elements in the network, wherein the RWA information further comprises a wavelength range that indicates the range of wavelengths a node's receiver can receive and a channel spacing, and wherein the type indicator indicates that the wavelength range is associated with a link, the channel spacing is associated with a link, and the transmitter range is associated with a link.

\* \* \* \* \*